United States Patent [19]
Vogeler et al.

[11] Patent Number: 5,621,525
[45] Date of Patent: Apr. 15, 1997

[54] APPARATUS AND METHOD FOR MEASURING THE POWER DENSITY OF A LASER BEAM WITH A LIQUID CRYSTAL

[75] Inventors: Thomas Vogeler; Theo Tschudi, both of Darmstadt, Germany; Nelson Tabirian, Orlando; Boris Zel'dovich, Winter Park, both of Fla.

[73] Assignee: University of Central Florida, Orlando, Fla.

[21] Appl. No.: 384,661

[22] Filed: Feb. 6, 1995

[51] Int. Cl.$^6$ .................................................. G01B 9/02
[52] U.S. Cl. .......................................... 356/345; 356/353
[58] Field of Search .................................. 356/345, 353, 356/354

[56] References Cited

U.S. PATENT DOCUMENTS

| | | |
|---|---|---|
| 3,771,065 | 11/1973 | Goldberg et al. . |
| 4,920,364 | 4/1990 | Andrews et al. . |
| 4,964,735 | 10/1990 | Sasnett et al. . |
| 5,042,950 | 8/1991 | Salmon .................... 356/345 |
| 5,218,610 | 6/1993 | Dixon . |
| 5,301,201 | 4/1994 | Dutta et al. . |
| 5,311,217 | 5/1994 | Guerin et al. . |

OTHER PUBLICATIONS

Laakmann et al., Innovative Power Meter Challenges Traditional Devic Laser Focus World, Jun. 1994. p. 135.
Coherent Instruments Division Advertisement: "ModeMaster", Circle No. 20 Advertisement, Dec. 1994.Photonics Spectra.
Graseby Optronics, Handheld Power Meter, Circle No. 50, Photonics Spectra, Advertisement, Dec. 1994.
Sukhov et al., The Orientational Optical Nonlinearity of Liquid Crystals, Special Issue of Mol.Cryst.Liquid Cryst.136, pp. 1–140, 1986.

*Primary Examiner*—Samuel A. Turner
*Attorney, Agent, or Firm*—Brian S. Steinberger; Law Offices of Brian S. Steinberger

[57] ABSTRACT

Meters detect power parameter information about laser beams using liquid crystals to propagate the beam therethrough with photodiode detectors. The power parameters include intensity in watts per square meter, beam waist size, and the location of the focal spot based in light induced orientational phenomena in the liquid crystal. The detectors can can count the number of interference fringe rings produced by a laser beam passing through the liquid crystal(LC). Alternatively, the time between the occurrence of each interference fringe ring can be measured to determine the power parameters. A preferred embodiment has a standard liquid crystal oriented at approximately 45 degrees to the axis of an incoming laser beam to be measured. The beam passing through the LC can be centered through a pinhole on a planar plate causing the interference fringe rings to appear on the surface of the plate. An alternative embodiment measures intensity based on determining the voltage necessary to produce fringe ring patterns. Corresponding the fringe ring patterns to intensity values can be done manually upon visual observation and calculation or automatically by computer.

14 Claims, 9 Drawing Sheets

Initial orientation of the optical axis of the liquid crystal

10

The optical axis of the liquid crystal is reorientated to an angle $\Theta$ in the electromagnetic field

10

APPARATUS AND METHOD FOR MEASURING THE POWER DENSITY OF A LASER BEAM WITH A LIQUID CRYSTAL

This invention relates to measuring laser energy, and in particular to a method and apparatus for measuring the intensity, beam waist, and power values by measuring the electromagnetic effects of laser beams on a liquid crystal.

BACKGROUND AND PRIOR ART

Power meters have been available to detect the power outputs of lasers. For example, many power meters rely on taking the temperature as a result of the thermal energy output of a laser target in order to determine the power output of the laser. For example, power meter generally measure temperature rise in a given thermal mass target over a fixed time interval which means that the detection is not instantaneous. Furthermore, the targets themselves generally must cool off completely in order to take new readings. Still furthermore, many of these prior art systems result in destructive measurements where for example, the targets themselves are not reusable. Such a power meter for detecting the thermo energy of a laser target is shown in U.S. Pat. No. 4,964,745 to Sasnett et al. which is incorporated by reference.

However, many laser applications are more often concerned with measuring intensity of the beam(i.e. the power flux per unit area) rather than the power itself as the "driving force", as the most important parameter that needs to be measured. Intensity parameters are important in applications concerning communication, nonlinear optical and scientific applications as well as in surgery and in technical applications such as material processing. Beam intensity is derived by calculation of the transverse size of the beam with the aid of known formulae for propagation of Gaussian beams or the beam intensity can be derived by the direct measurement of the beam size with the aid of expensive imaging systems. Related to beam intensity measurements as well as for many other tasks, the Gaussian profile of the laser beam has to be verified and, especially for sharply focussed beams, the location for the focal spot has to be found.

Thus, from the above information it is known that present technology solutions require time-consuming and complex procedures, and expensive equipment that can cost approximately $10,000 or more.

SUMMARY OF THE INVENTION

The first objective of the present invention is to provide a technique for the direct measurement of the intensity of a laser beam.

The second object of this invention is to provide a technique for the direct measurement of the power of a laser beam.

The third object of this invention is to provide a technique for the direct measurement of the beam waist of a laser beam.

The fourth object of this invention is to provide a technique for the direct measurement of the profile of a laser beam.

The fifth object of this invention is to provide a technique for the non-destructive measurements of the intensity parameters of a laser beam.

The sixth object of this invention is to provide an inexpensive technique for the direct nonthermal measurement of the intensity parameters of a laser beam.

The seventh object of this invention is to provide for determining the focal point of a laser beam.

The eighth object of this invention is to provide for parallel measurements of the intensity values for two or more beams.

The invention includes positioning and focussing a laser beam into a liquid crystal and taking the passed through beam to display onto and about a pinhole on a flat planar type screen such as but not limited to paper, metal and the like. The fringe ring patterns that are exhibited on the plate are measured either by their spacing apart from one another or by their time of arrival between rings to determine intensity parameters of the laser beam. The liquid crystal can also be moved either forward or backward to determine the focal point of the laser beam. Determining intensity parameters from the fringed ring pattern can be done manually for example by counting the number of rings, or automatically by computer calculating the intensity through formulas.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
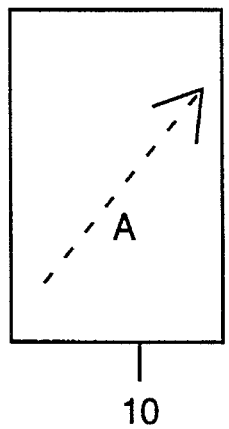
FIG. 1A shows the initial orientation of the optical axis of a liquid crystal(LC).
Figure 1B:
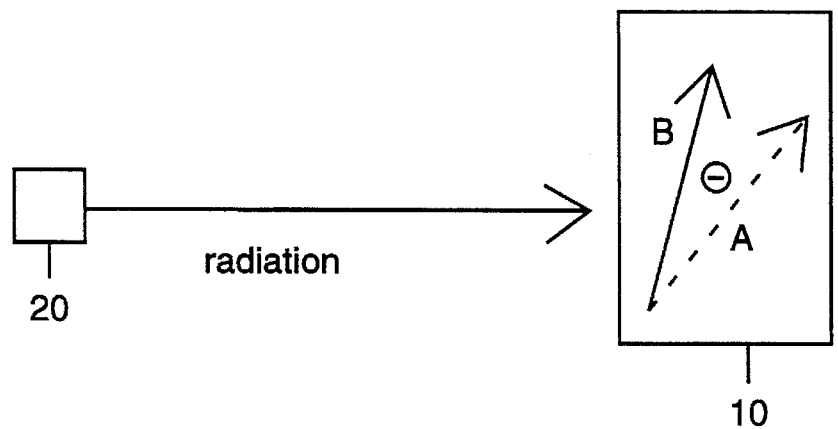
FIG. 1B shows the reorientated optical axis of the LC after being radiated from a light source.

FIG. 1A shows the initial orientation of the optical axis by arrow A of a liquid crystal 10 that has not been subject to radiation. The inventors determined that light waves can reorient liquid crystals(herein after referred to as LC). N. V. Tabiryan, B. Ya. Zel'dovich, A. V. Sukhov. The Orientational Nonlinearity of Liquid Crystals. Special Issue of Mo.Cryst. Liquid Cryst. 136,pp. 1–139, 1986. FIG. 1B shows the reoriented optical axis B of a liquid crystal after being radiated from an electromagnetic radiation source 20, such as a laser beam or microwave radiation. θ is equal to the reorientation angle between the reoriented optical axis B and initial orientation axis A.

Figure 2A:
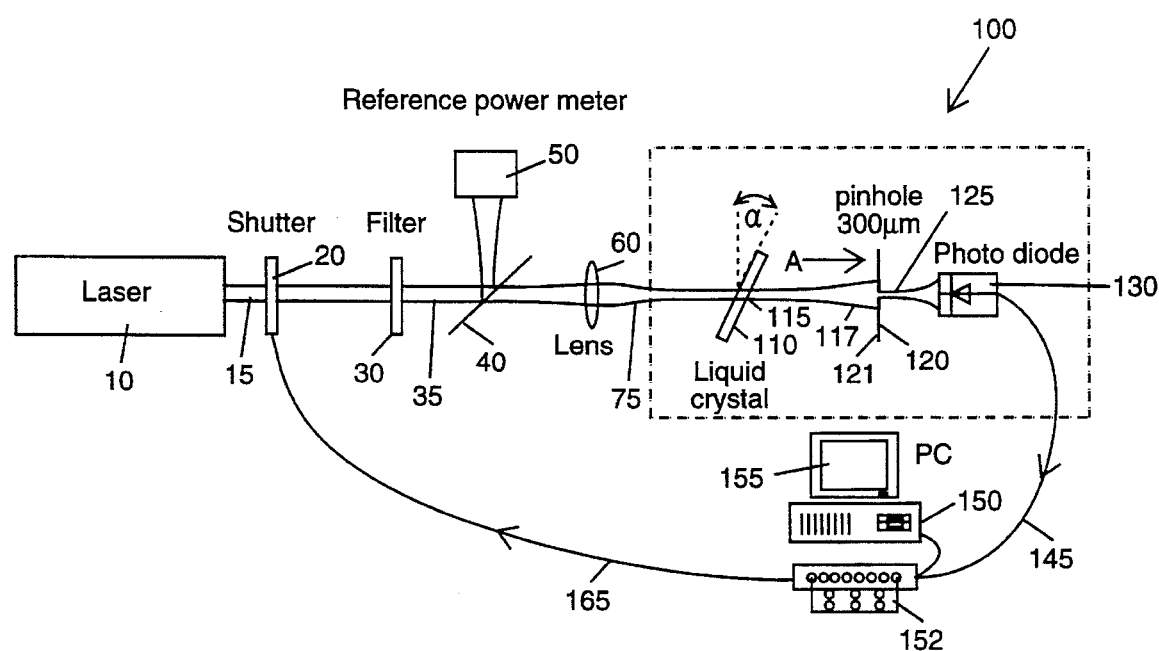
FIG. 2A is a perspective view using the invention to measure the intensity of a laser beam.

FIG. 2A is a perspective view using the invention 100 to measure the intensity of a laser beam 75. An Argon-Ion Laser 10 pumped a beam 15 having a wavelength of 514 λ=514 nm. Beam 15 was controlled through a standard open and close shutter 20 by keyboard 152 of personal computer 150 to pass through a neutral density color filter 30. Beam 35 splits at a minor splitter 40 to reference power meter 50 such as the Power meter described in U.S. Pat. No. 4,964,735 to Sasnett et al. as a comparison for a reference measurement. Beam 35 is also slightly focussed by lens 60 having a focal length of 15 cm, into liquid crystal(LC) 110 which has a variable angle of incidence α, both of which will be explained in more detail below and in reference to FIG. 3. Referring to FIG. 2A, beyond the LC 100 is a planar metal type plate 120 having a pinhole, 125 of approximately 300 μm, therethrough. Pinhole 125 is used in order to position the on-axis transmission of beam 117 using a photo-diode 130, which was connected to computer 150,152 which could calculate intensity and focal point based on equations listed below to show results on display 155. Alternatively, intensity can be determined by manual calculations based on the display of fringe rings.

Figure 2B:
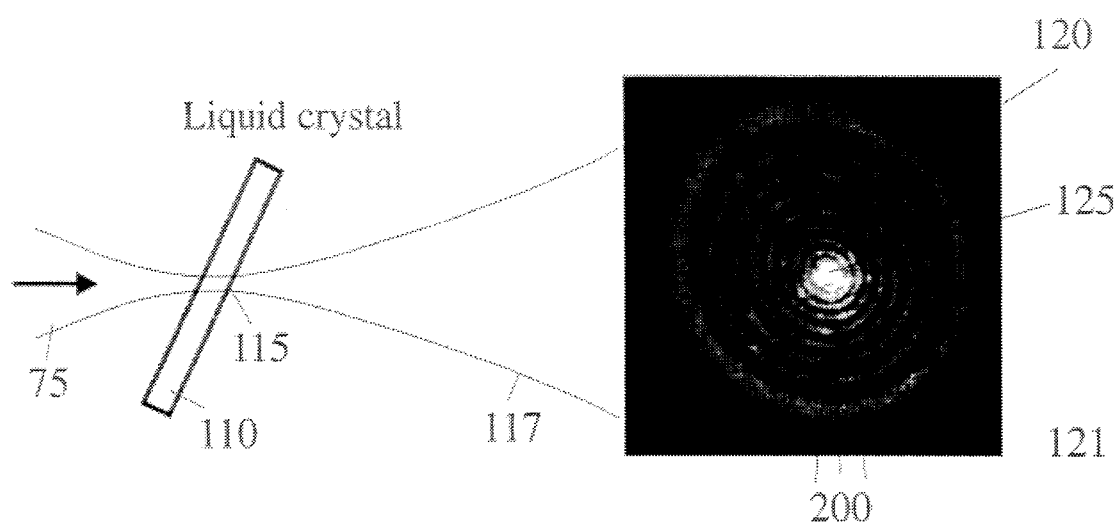
FIG. 2B shows a fringe ring pattern formed on the plate along arrow A of FIG. 2A after the laser beam passes through a liquid crystal.

FIG. 2B shows an intrinsic fringe ring pattern 200 formed on the on the face 121 of plate 120, along arrow A of FIG. 2A, after the laser beam passes 117 through a liquid crystal 110.

Liquid crystal(LC) 110 used in FIG. 2A and 2B can be a standard type comprising a liquid such as nematic, cholesteric, smectic, and the like between parallel glass plates. LC's which can be incorporated in the invention include those depicted in U.S. Pat. No. 4,394,069 to Kaye and U.S. Pat. No. 4,964,735 to Sasnett et al. which are both incorporated by reference. In experiments by the inventors, two different thickness Liquid Crystals manufactured by Merck, of Darmstadt, Germany were used. ZLI 3219 having a thickness of 50 μm and ZLI 1132 having a thickness of 100 μm were used and whose results are shown in FIG. 3.

Figure 3:
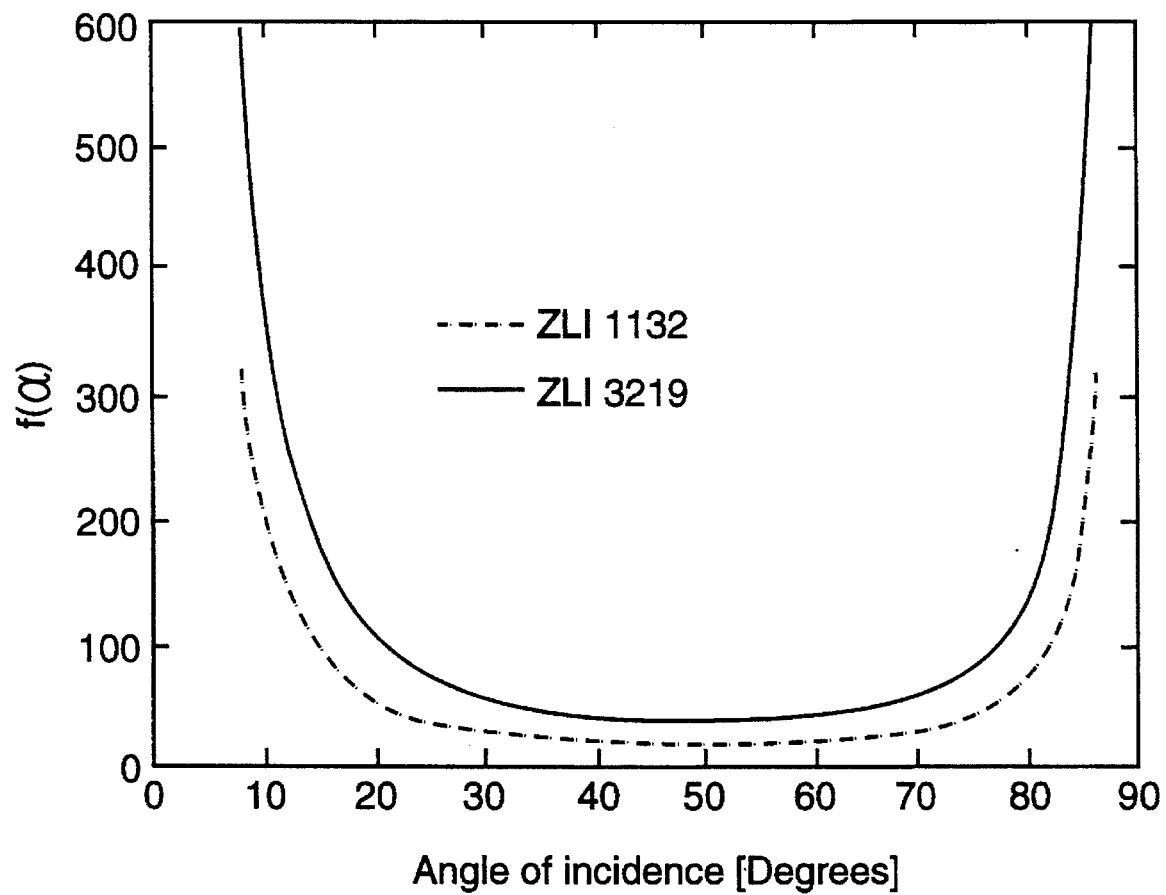
FIG. 3 is a plot showing the dependence of the sensitivity of the Liquid-Crystal Cell on the incidence angle for two Liquid Crystal(LC) materials.

FIG. 3 is a plot showing the dependence of the sensitivity of the Liquid-Crystal Cell 110 of FIG. 2A and 2B, on the incidence angle α, for two Liquid Crystal(LC) materials ZLI. From FIG. 3, it is apparent that the various manual adjustments of positioning the LC along various incidence angles α, shows that maximum sensitivity for both types of LC's(1132 and 3219) occurrs at approximately 45 degrees. This means that the largest number of interference fringe rings would occur at α of 45 degrees, and further that different thicknesses of liquid crystals donot substantially change the preferred incidence angle for setting the LC.

Figure 4A:
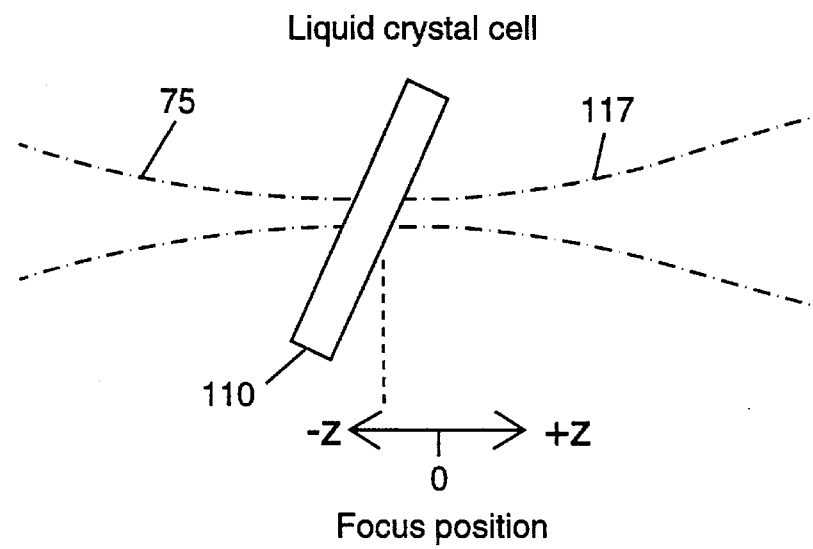
FIG. 4A shows using the liquid crystal of FIG. 2A to locate the focal point of the laser by moving the LC along the direction of the Z-axis.

FIG. 4A shows using the liquid crystal of FIG. 2A to locate the focal point of the laser by moving the LC along the direction of the Z-axis. While the number of interference fringe rings determines the beam intensity, the form of the interference fringe patterns is correlated with the transverse shape of the beam. High sensitivity of the LC reorientation to the intensity allow thus to locate the focal spot of a lens with high accuracy. The positioning procedure for locating the focal point of laser beam 75 of FIG. 2A, consists in moving liquid crystal cell 110 to a position along the z-axis, where the maximum number of interference fringe rings appear on the face 121 of plate 120. The location of LC 110 is then the focal point location. Alternatively, the focal point can also be determined at the point where the maximal speed of the interference process is detected as determined by the highest number of ring oscillations reaching photo-diode 130. In other words, at the point in space where the rings appear to be generated with greatest speed (the point of creation liar the rings) is the focal point.

Figure 4B:
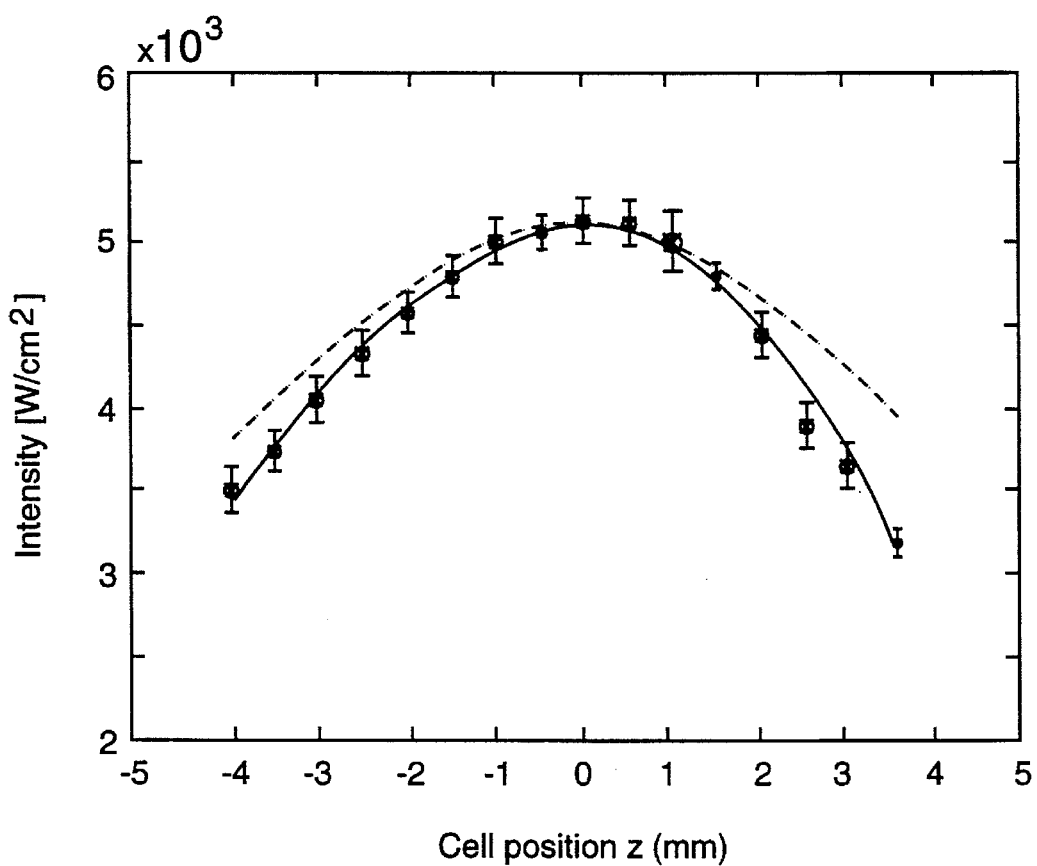
FIG. 4B is a plot of the intensity in watts per square centimeter verses LC position along the Z-axis.

FIG. 4B is a plot of the intensity in watts per square centimeter verses LC position along the Z-axis. Here, moving both LC 1132 and LC 3219 to cell position 0 cm along the z-axis shows the same intensity value of laser beam 75 to be approximately 5 W/cm².

As previously mentioned, intensity of a laser beam can be determined by the number of fringe rings 200 shown in FIG. 2B that visually appear on surface 121 of plate 120. This maximum number can be correlated to an intensity value by the following formula.

The intensity of the beam in its center I (measured in Watt per square centimeter) is related to the number of rings N (dimensionless parameter) counted on a screen, as an example, by naked eye:

$$I = Nf(\alpha)I_0 \qquad (1)$$

where $$f(\alpha) = \left(\frac{\epsilon_\|}{\epsilon_\alpha}\right)^2 \frac{(\sqrt{\epsilon_\| - \sin^2\alpha} + \sqrt{\epsilon_\| \epsilon_\perp} \cos\alpha)^2}{\sqrt{\epsilon_\| \epsilon_\perp} \sin^2 2\alpha (\epsilon_\| - \sin^2\alpha)^{3/2}} \qquad (2)$$

and $$I_0 = 10^{-7} \frac{\pi^4 \lambda c K_3}{8L^3} \qquad (3)$$

Here $c=3.10^{10}$ cm/s is the speed of light in vacuum, $\lambda$(cm) is the wavelength of laser radiaiton in vacuum, L(cm) is the thickness of liquid crystalline layer of the cell, $K_3$()erg/cm is the elastic constant of the LC, $n_\|=\sqrt{\epsilon_\|}$ and $n_\perp=\sqrt{\epsilon_\perp}$ (dimensionaless) are the extraordinary and ordinary refractive indices of LC, $\epsilon_\alpha=\epsilon_\|-\epsilon_\perp$ is the optical anisotropy, α(degrees) is the incidence angle, and the coefficient $10^{-7}$ Joul/erg stands for transition from ESU to SI units. The above presented formulae are for the case 0°<α<90°) and when the glass plates of the nematic LC-cell give strong homeotropic orientation of molecules (perpendicular to the glass plates).

For α=45°, $n_\|=1.7$, $n_\perp=1.5$ $\lambda=5.14510^{-5}$ cm, $L=5.10^{-3}$ cm, $K_3=5.10^{-7}$ erg/cm the value $f(\alpha)=24.3$ and $I_0=7.52$ W/cm². Thus, for example, N=5 rings are counted for the incident intensity I=951.2 W/cm².

Figure 5:
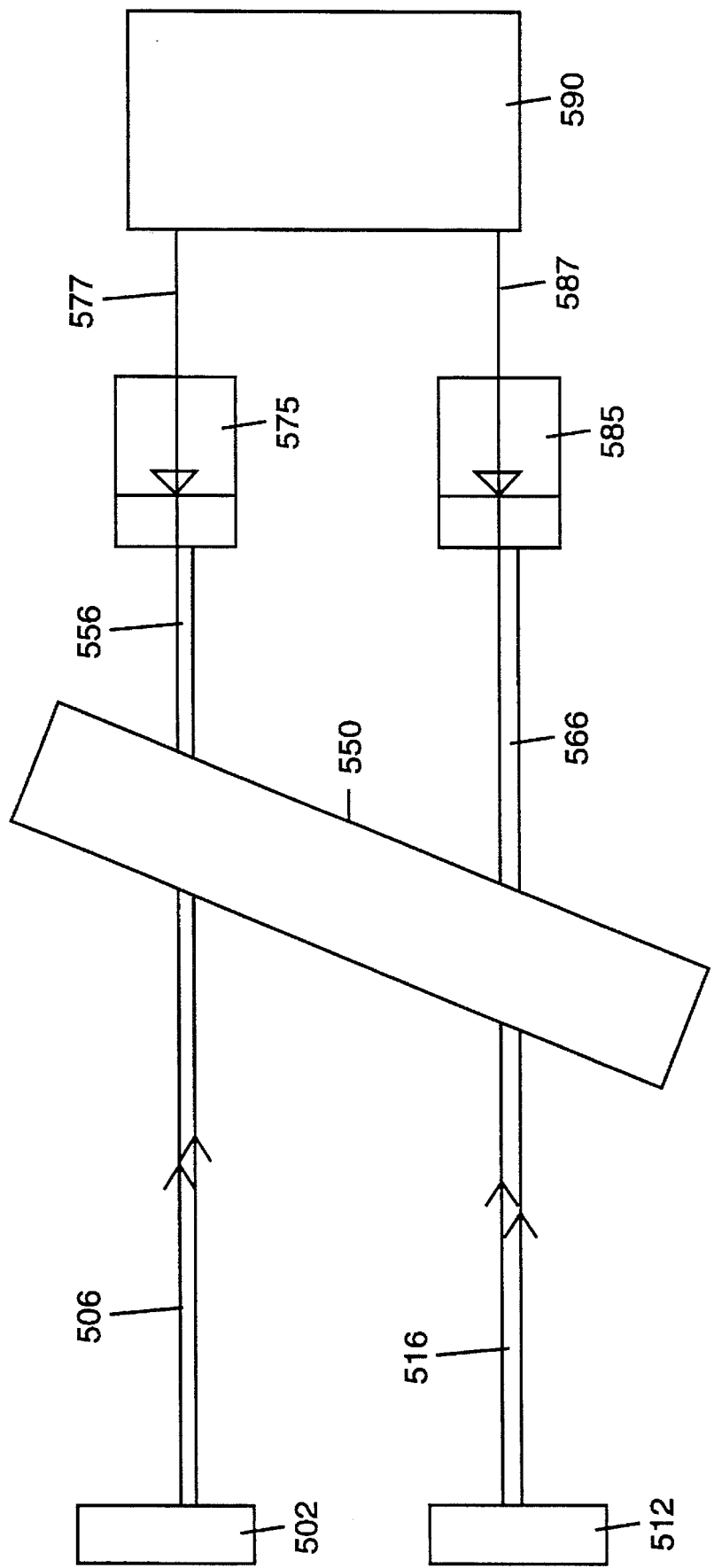
FIG. 5 shows a schematic of using the invention of FIG. 2A to simultaneously measure the intensity of two beams.

FIG. 5 shows a schematic of using the invention of FIG. 2A to simultaneously measure the intensity of two beams. Here, two separate lasers 502, 512 each emit laser beams 506 and 516 respectively similar to the laser source and initial laser beam depicted in FIG. 2A. Referring to FIG. 5, a Liquid Crystal 550 reorients the beams into beams 556, 566 to be directed into photo-diodes 575, 585, respectively. A detector receiver 590 similar to the computer/monitor/display 150, 152, 155 of FIG. 2A, receives the respective measurements and can simultaneously calculate intensity values. Liquid Crystal 550 can simultaneously pass plural laser beams therethrough for intensity measurement analysis as long as the incoming beams 506, 516 are separated from one another.

Figure 6:
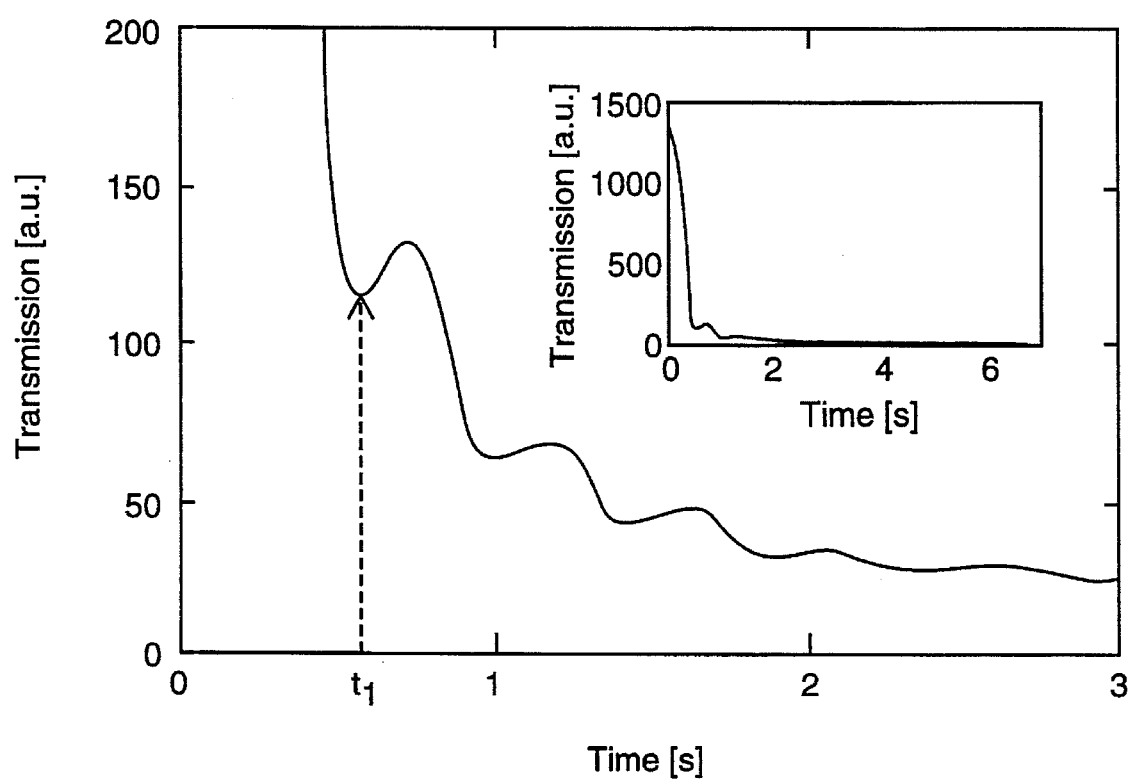
FIG. 6 is a plot of the temporal behavior of on-axis intensity where the moment, t1, of the first minimum allows for the determination of intensity of the laser beam.

FIG. 6 is a plot of the temporal behavior of on-axis intensity where the moment, t1, of the first minimum allows for the determination of intensity of the laser beam.

Nonthreshold effect is characterized by a typical exponential relaxation $$\theta = \theta_m(1 - e^{-t/\tau}), \quad (4)$$

where $$\tau = \left(\frac{L}{\pi}\right)^2 \frac{\gamma}{K_3} \quad (5)$$

and $\gamma$(Poise) is the viscousity constant of the LC The response time is $\tau=2.5$ s for $\gamma=0.5$ Poise and $L \approx 50$ μm. This allows to carry out measurement of intensity through the measurement of the dynamics, for example through the measurement of the time $t_1$ whent the nonlinear phase shift becomes equal to π. The intensity is then related to the time $t_1$ as $$I = \frac{\tau f(\alpha) I_0}{2t_1} \quad (6)$$

For the above discussed example, $t_1=0.2$ s which shows that the measurement procedure is 12.5 times faster than when carrying out by the registration of the total number of the rings.

Figure 7:
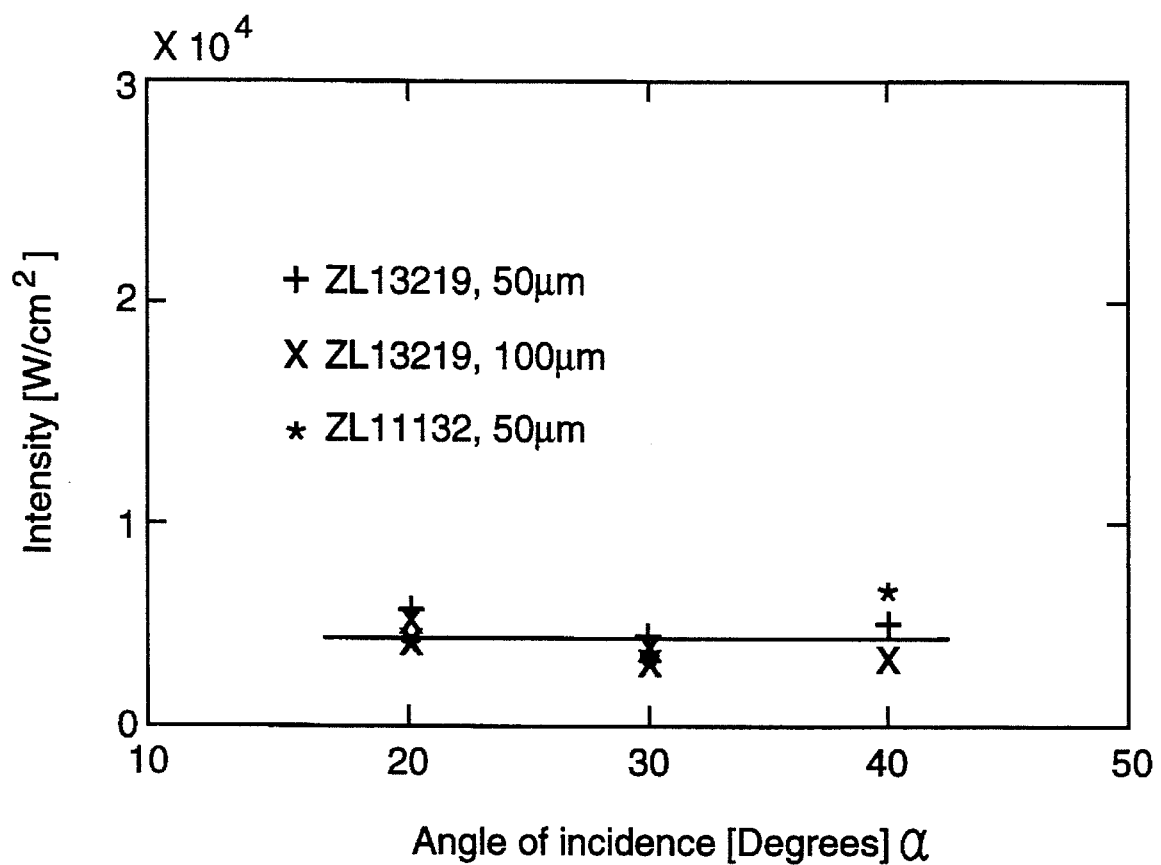
FIG. 7 is a graph shows the coincidence of using different thicknesses of Liquid Crystals with various angles of beam incidence.

FIG. 7 is a graph shows the coincidence of using three different thicknesses of Liquid Crystals with various angles of beam incidence. Orienting each LC at the same incidence angle shows that intensity does not change depending upon different thickness types of Liquid Crystals.

Figure 8:
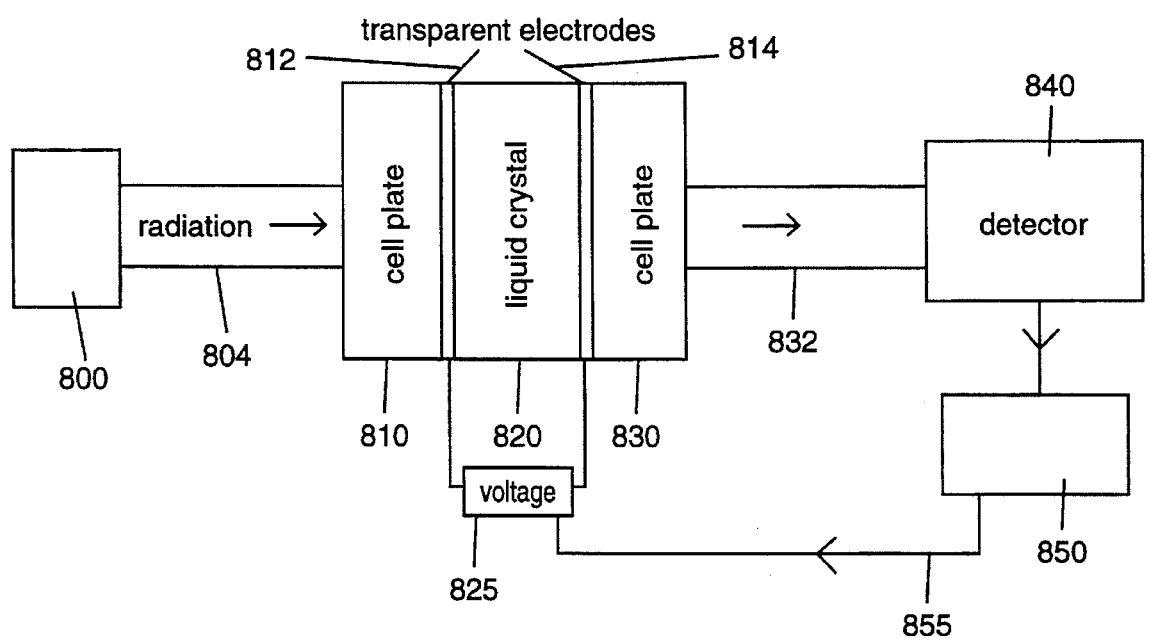
FIG. 8 is a perspective view of an alternative liquid crystal technique for determining laser beam intensity.

The preferred embodiments discussed above generally use the phase modulation induced by the radiation where the phase modulation affects the propagation of the radiation beam. FIG. 8 shows an alternative embodiment that measures intensity values of the laser beam without having to introduce perturbations such as a phase shift in the beam itself. FIG. 8 is a perspective view of an alternative liquid crystal technique for determining laser beam intensity. Laser source 800 emitts laser beam 804 which passes through cell plate(glass plate) 810, liquid crystal 820, cell plate 830, transparent electrodes 812, 814, and onto photo-diode detector 840 and computer/display 850 similar to those described previously. As laser 800 is turned on, oscillation rings are detected by diode-detector 840. Voltage supply 825 can be used to characterize the intensity of the laser beam 804. Feedback circuit 855 can be used to control voltage supply 825 so that a voltage value can be determined. In operation, plate 120 of FIG. 2A is inspected to determine when the position of LC 110 creates the largest number of fringe rings thereon, then voltage supply can be adjusted either up or down so that when fringe ring pattern begins to disapear, that voltage level would correspond to the Laser intensity value.

To support a number N of rings for the given intensity I the following voltage has to be applied to the LC-layer in the cell:

$$V = V_F \sqrt{1 + \frac{I}{NI_0 f(\alpha)}} \quad (7)$$

where $$V_F = \pi \sqrt{\frac{K_3}{\delta \epsilon}} \quad (8)$$

with $\delta \epsilon$ being the anisotropy of the dielectric constant of the LC for the dc-voltage. Thus, for the above discussed example, to reduce the number of rings from 5 to 1, a voltage equal to 0.5 V has to be applied for an LC with $\delta \epsilon = 10$.

Although the embodiment described measuring the intensity of an Argon-Ion Laser, other types of laser beams can be measured for their intensity values. Lasers sealed, flowing, solid-state lamp-pumped, solid-state laser-pumped, solid-state diode-pumped, ion<1 W, ion>1 W, HeCd, HeNe, metal vapor, dye, Excimer, Titanium Saphire and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An apparatus for measuring the energy output parameters of a laser comprising:

means for producing a laser beam;

a liquid crystal means for receiving the produced laser beam and for passing the laser beam therethrough;

a detector means connected to the liquid crystal for outputting parameter characteristics of the laser beam dependent upon the change the optical axis caused by the liquid crystal, wherein the parameter characteristics include at least one of intensity of the laser beam and power wattage per square meter.

2. The apparatus for measuring the laser beam of claim 1, wherein the parameter characteristics further include:

beam waste size.

3. The apparatus for measuring the laser beam of claim 1, wherein the liquid crystal further includes:

positioning the Liquid Crystal at an approximate 45 degree angle to the axis of the incoming laser beam to be measured.

4. The apparatus for measuring the laser beam of claim 1, wherein the detector means includes:

a photodiode for sensing the number of intrinsic interference rings produced by the liquid crystal.

5. The apparatus for measuring the laser beam of claim 4, further including:

means for counting the number of intrinsic interference rings to indicate a parameter characteristic of the laser beam.

6. The apparatus for measuring the laser beam of claim 1, wherein the detector means includes:

a polarizer.

7. The apparatus for measuring the laser beam of claim 1, wherein the detector means includes:

means for measuring the phase modulation of the laser beam caused by the liquid crystal.

8. The apparatus for measuring the laser beam of claim 1, further comprising:

electrodes attached to opposite sides of the liquid crystal.

9. A method for measuring intensity parameters of a laser beam by detecting non-thermal characteristics comprising the steps of:

producing a laser beam;

passing the beam through a liquid crystal oriented at approximately 45 degrees to the axis of the incoming laser beam to form an output signal; and measuring non-thermal characteristics of the output signal to determine the intensity parameters of the laser beam.

10. The method for measuring intensity parameters of a laser beam of claim 9, wherein the non-thermal characteristics include:

intrinsic interference fringe rings produced by the liquid crystal.

11. The method for measuring intensity parameters of a laser beam of claim 10, further including the steps of:

counting the number of intrinsic interference fringe rings to indicate the intensity parameters of the laser beam.

12. A power meter for measuring the power of a laser beam comprising:

means for producing a laser beam;

a liquid crystal means oriented at approximately 45 degrees to the axis of the incoming laser beam for receiving the laser beam and outputting interference fringe rings;

a photodiode for determining the power of the laser beam from the interference fringe rings.

13. The power meter for measuring the power of the laser beam of claim 12, further comprising:

means for counting the number interference fringe rings.

14. The power meter for measuring the power of the laser beam of claim 12, further comprising:

means for counting the time of occurrence of each interference fringe ring.

* * * * *

UNITED STATES PATENT AND TRADEMARK OFFICE
CERTIFICATE OF CORRECTION

PATENT NO. : 5,621,525
DATED : April 15, 1997
INVENTOR(S) : Nelson Tabiryan

It is certified that error appears in the above-identified patent and that said Letters Patent is hereby corrected as shown below:

On title page [75],

Delete the following order of inventors "Thomas Vogeler; Theo Tschudi, both of Darmstadt, Germany; Nelson Tabirian, Orlando; Boris Zel'dovich, Winter Park, both of Fla."

and replace same with

--Nelson Tabiryan, Orlando; Boris Zel'dovich, Winter Park, both of Fla., Thomas Vogeler; Theo Tschudi, both of Darmstadt, Germany.--

Signed and Sealed this

Twenty-fourth Day of March, 1998

Attest:

BRUCE LEHMAN

*Attesting Officer*　　　　　*Commissioner of Patents and Trademarks*

UNITED STATES PATENT AND TRADEMARK OFFICE
CERTIFICATE OF CORRECTION

PATENT NO. : 5,621,525
DATED : April 15, 1997
INVENTOR(S) : NELSON TABIRYAN, THOMAS VOGELER, THEO TSCHUDI, BORIS ZEL'DOVICH It is certified that error appears in the above-indentified patent and that said Letters Patent is hereby corrected as shown below:

<u>IN THE LISTING OF INVENTORS</u> ITEM [75]:

The listing of inventors should appear as follows:

Nelson Tabirian
Thomas Vogeler
Theo Tschudi
Boris Zel'dovich

This Certificate Supersede Certificate of Correction Issued March 24, 1998.

Signed and Sealed this

Twentieth Day of June, 2000

Attest:

Q. TODD DICKINSON

*Attesting Officer*   *Director of Patents and Trademarks*